(12) United States Patent
Svensson et al.

(10) Patent No.: US 8,738,231 B2
(45) Date of Patent: May 27, 2014

(54) METHOD AND A SYSTEM FOR ASSISTING A DRIVER OF A VEHICLE DURING OPERATION

(75) Inventors: Jan-Inge Svensson, Göteborg (SE); Jochen Pohl, Göteborg (SE); Sten Ragnhult, Onsala (SE); Johan Hultén, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 13/380,937

(22) PCT Filed: Jun. 29, 2009

(86) PCT No.: PCT/SE2009/000335
§ 371 (c)(1),
(2), (4) Date: Dec. 27, 2011

(87) PCT Pub. No.: WO2011/002345
PCT Pub. Date: Jan. 6, 2011

(65) Prior Publication Data
US 2012/0265403 A1    Oct. 18, 2012

(51) Int. Cl.
*G06F 17/00* (2006.01)
*B62D 5/04* (2006.01)

(52) U.S. Cl.
USPC ............................................ 701/41; 180/443

(58) Field of Classification Search
USPC ........ 701/41, 43; 180/443, 444, 446; 318/432
See application file for complete search history.

(56) References Cited

U.S. PATENT DOCUMENTS

| | | | | |
|---|---|---|---|---|
| 6,134,491 A | * | 10/2000 | Kawagoe et al. | 701/43 |
| 6,212,453 B1 | * | 4/2001 | Kawagoe et al. | 701/41 |
| 6,640,923 B1 | | 11/2003 | Dominke et al. | |
| 2006/0069481 A1 | * | 3/2006 | Kubota et al. | 701/41 |
| 2007/0055431 A1 | | 3/2007 | Deng et al. | |
| 2009/0153360 A1 | | 6/2009 | Kim | |
| 2010/0228438 A1 | * | 9/2010 | Buerkle et al. | 701/41 |

FOREIGN PATENT DOCUMENTS

| | | |
|---|---|---|
| DE | 102005023832 A1 | 11/2006 |
| DE | 102007050189 A1 | 4/2009 |
| DE | 102007061900 A1 | 6/2009 |

(Continued)

OTHER PUBLICATIONS

International Search Report for corresponding International Application PCT/S2009/000335.

(Continued)

*Primary Examiner* — Fadey Jabr
*Assistant Examiner* — Aaron L Troost
(74) *Attorney, Agent, or Firm* — WRB-IP LLP

(57) ABSTRACT

A method for assisting a driver of a vehicle during operation in order to avoid an undesired situation based on a current driving scenario includes predicting if a first guiding force to a vehicle steering device is desired in order to avoid the undesired situation and, if the first guiding force is desired, predicting a total guiding force comprising the first guiding force, which would be applied to the steering device for avoiding the undesired situation, comparing the predicted total guiding force with a limit value, and if the predicted total guiding force exceeds the limit value, in advance, deciding whether to apply the predicted total guiding force to the steering device for avoiding the undesired situation or not.

28 Claims, 5 Drawing Sheets

(56) References Cited

FOREIGN PATENT DOCUMENTS

| EP | 1884449 A1 | | 2/2008 |
|----|----|----|----|
| WO | 2004074059 A2 | | 9/2004 |
| WO | WO2008/071926 | * | 6/2008 |
| WO | WO 2008/077668 A1 | * | 7/2008 |
| WO | 2009022947 A1 | | 2/2009 |

OTHER PUBLICATIONS

International Preliminary Report on Patentability for corresponding International Application PCT/S2009/000335.

Supplementary European Search Report (Oct. 12, 2012) for corresponding European App. EP 09 84 6892.

* cited by examiner

METHOD AND A SYSTEM FOR ASSISTING A DRIVER OF A VEHICLE DURING OPERATION

BACKGROUND AND SUMMARY

The present invention relates to method and a system for assisting a driver of a vehicle during operation in order to avoid an undesired situation based on a current driving scenario.

The undesired situation may for example represent a departure from a desired future trajectory of the vehicle. In other words, the invention is applicable for so-called lane keeping of a vehicle during operation. A current driving scenario that represents an unintentional lane departure may be determined based on the vehicle's position, direction and/or orientation with respect to a traffic lane (or road edge). Further, there are systems known, which are configured for monitoring the course of the traffic lane ahead of the vehicle, such as by monitoring lane markings using a vision system. The lane keeping support system is preferably configured to provide such guiding force only in situations in which the supply of such guiding force to the steering device is deemed to be appropriate after analysis of all input data, such as the course of the traffic lane ahead of the vehicle, further vehicles on the road and a predicted driving behaviour of the vehicle.

The guiding force exerted onto the steering device is resistive if counteracting the force applied by the driver onto the steering device, or supportive if acting in the same direction as the force applied by the driver onto the steering device, thus for instance reducing the effect of e.g. frictional forces acting on the wheels and the like which are experienced by the driver as resistance when operating the steering device. The steering device is normally formed by a conventional steering wheel in the case of a vehicle. However, the invention is applicable to other steering devices, such as a joystick, a sliding nipple or any other suitable steering device for steering the vehicle. For instance, in the case that the steering device is a steering wheel, the guiding force will appear as a guiding torque exerted onto the steering wheel.

According to U.S. Pat. No. 6,640,923, it is known to combine a power-assisted steering system with a lane keeping function. A steering actuator may reduce the torque to be manually applied for steering the vehicle and thus may relieve the driver. In addition, in power-assisted steering systems, it is believed that the torque support and/or the transmission ratio of the steering system are speed dependent. At lower speeds, such as those typical for parking and unparking, very direct steering having high torque support may be used, while during more rapid travel, indirect steering having low torque support may be desirable.

In many countries/regions there are legal requirements limiting the allowable guiding force to be applied to the steering device. According to a known method, the guiding torque applied to the steering wheel is automatically limited to the allowed limit during an intervention. However, such automatic limitation may lead to that the intervention is unsuccessful since the intervention could not be carried out to the desired extent.

It is desirable to achieve a method for assisting a driver which creates conditions for a further improved safety during operation, especially in case there is a predefined limit for the amount of the guiding force.

According to an aspect of the present invention, a method includes:
predicting if a first guiding force to a vehicle steering device is desired in order to avoid said undesired situation, and if the first guiding force is desired:
predicting a total guiding force comprising the first guiding force, which would be applied to the steering device for avoiding the undesired situation,
comparing the predicted total guiding force with a limit value, and if the predicted total guiding force exceeds the limit value,
in advance deciding whether to apply said predicted total guiding force to the steering device for avoiding the undesired situation or not.

Thus, the total guiding force comprising the first guiding force would be applied to the steering device during an intervention for avoiding the undesired situation. Preferably, the intervention is performed during a driver steering operation. Preferably, the guiding force applied is only supportive, i.e. it is limited to such an extent that the driver still has full authority to steer the vehicle. However, the system may be configured to take control of the vehicle and in the case of lane keeping, return it to a safe position in the original lane.

In this way, a decision is made in advance, i.e. before an intervention is started, whether the intervention can be carried out to an extent leading entirely to the desired result. It has been acknowledged that in somecases it might be better not to apply the first guiding force at all than having to interrupt the intervention.

In other words, starting an intervention may provide the driver with a false appearance of safety since the supportive guiding force applied may not be sufficient for entirely avoiding the unintentional situation.

The total guiding force may comprise solely the first guiding force. However, according to a preferable example, the method comprises the steps of determining a second guiding force based on at least one guiding force operation model, and determining the predicted total guiding force as a sum of the first guiding force and the second guiding force. Thus, said second guiding force may be determined in accordance with other steering aspects, such as providing a certain steering feel to the operator, see further below. This example creates conditions for continuously controlling the guiding force applied to the steering device based on the second guiding force and only during said operation to avoid the undesired situation control the guiding force also based on the first guiding force.

According to an example embodiment, the method comprises the step of deciding to not apply said predicted total guiding force if it exceeds the limit value. Instead, it may be decided in advance to apply a limited total guiding force. Especially, the first guiding force, which is determined for avoiding the undesired situation (such as lane departure) may be cancelled all together.

According to a further example embodiment, the method comprises the step of deciding to apply said predicted total guiding force only if it is estimated to be sufficient for entirely avoiding the undesired situation.

According to a further example embodiment, the method comprises the steps of irrespective of any prediction of the first guiding force:
continuously during operation determining the second guiding force,
continuously applying the total guiding force comprising the determined second guiding force to the steering device, and only if the first guiding force is desired determining the predicted total guiding force as said sum of the first guiding force and the second guiding force.

This embodiment creates conditions for using an Electrical Power Assisted Steering (EPAS) system, Especially, the method is applicable in steering systems where there is a mechanical connection between the steering device and the ground but where the inherent steering feel resulting from the mechanical connection during operation is eliminated or at least suppressed. Such a system is known, in which a guiding, force (the second guiding force above) is continuously determined during operation so that the driver experiences a desired feel in the steering device instead of the inherent steering feel resulting from the mechanical connection.

For example, the inherent mechanical friction in the actual steering arrangement depends on different operational conditions, such as manufacturing tolerances, wear, temperature, age etc. Thus, the mechanical friction in the mechanical connection is different for different individual vehicles and varies over time. Thus, this embodiment creates conditions for decoupling the hardware (mechanical connection) from the friction steering feel. In other words, the embodiment creates conditions for an application-independent (hardware-independent) friction steering feel.

According to a further development of the last-mentioned example embodiment, said at least one guiding force operation model comprises at least one desired steering characteristic parameter. The steering characteristic parameter can be a guiding force influencing operational parameter. Said at least one desired steering characteristic parameter is preferably formed by vehicle lateral acceleration.

It is specifically advantageous to combine a safety function, such as lane keeping, with this type of EPAS since a certain lateral acceleration requires a certain amount of guiding force which already is determined in the EPAS system.

It is also desirable to achieve a system for assisting a driver which creates conditions for a further improved safety during operation, especially in case there is a predefined limit for the amount of the guiding force.

A system according to an aspect of the present invention is proivded comprising a means for predicting if a first guiding force to a vehicle steering device is desired in order to avoid said undesired situation, a means for predicting a total guiding force comprising the first guiding force, which would be applied to the steering device for avoiding the undesired situation and for comparing the predicted total guiding force with a limit value in order to in advance deciding whether to apply said predicted total guiding force to the steering device for avoiding the undesired situation or not if the predicted total guiding force exceeds the limit value.

According to an example embodiment, the system comprises a means for determining a second guiding force based on at least one steering device guiding force operation model, and a means determining the predicted total guiding force as a sum of the first guiding force and the second guiding force. Thus, said second guiding force may be determined in accordance with other steering aspects, such as providing a certain steering feel to the operator.

According to a further example embodiment, said at least one guiding force operation model comprises at least one desired steering characteristic parameter. Thus, the model can be designed to represent a nominal vehicle. Preferably, said at least one desired steering characteristic parameter comprises at least one of damping of steering device movements, tire friction, self alignment of the steering device to a neutral position and friction in a mechanical connection between the steering device and the wheels.

According to a further example embodiment, the system comprises a mechanical connection between the steering, device and the wheels for a mechanical transmission of steering signals from the steering device to the wheels, a means for decoupling a driver steering feel from the influence of the mechanical connection and for providing the driver with a desired steering feel based on the determined total guiding force. Preferably, a delivered steering device guiding force is measured and compared with an estimated desired steering device guiding force, wherein the delivered steering device guiding force is adapted by use of a feedback controller to be substantially the same as the desired steering device guiding force through adapting the amount of said guiding force.

Further preferred embodiment and advantages thereof emerge from the description below, the figures and the claims.

BRIEF DESCRIPTION OF FIGURES

The invention will be described in greater detail below with reference to the embodiment shown in the accompanying drawings, in which FIG. 1 schematically shows a system for performing the inventive method according to one embodiment.

DETAILED DESCRIPTION

Figure 1:
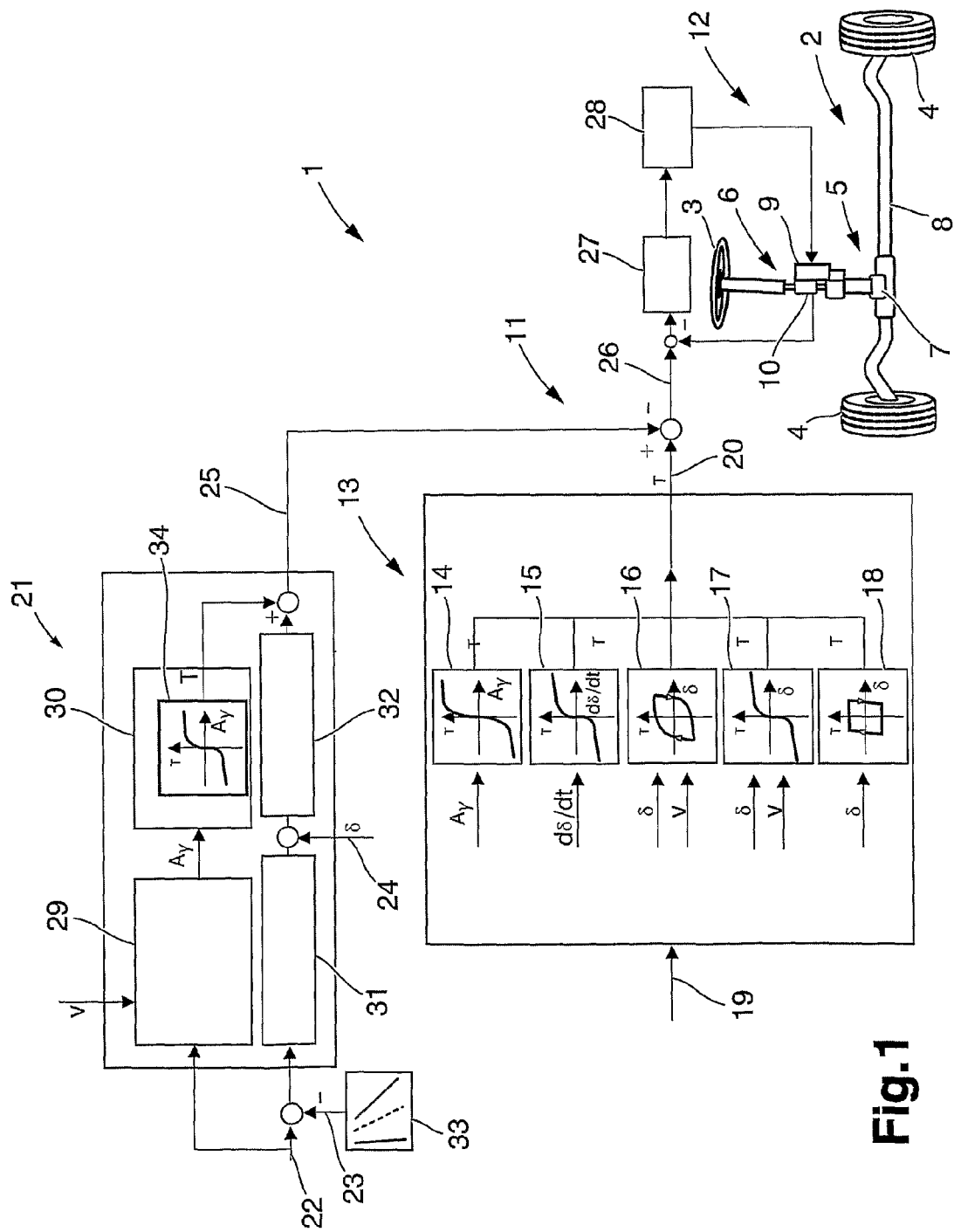

The invention is below described for application in a truck. However, the invention should not be regarded as limited to trucks, but it may be applied also in other vehicles, such as cars. FIG. 1 schematically shows a system I for performing a control method according to one embodiment. The system 1 comprises a mechanical steering arrangement 2, which may be of a conventional type. The mechanical steering arrangement 2 comprises a steering device 3 in the form of a steering wheel, at least one ground engagement member 4 in the form of a wheel and a mechanical connection 5 between the steering wheel 3 and the wheels 4 for transmission of steering signals from the steering wheel 3 to the wheels 4.

The steering wheel 3 is arranged in a vehicle passenger compartment and manually operated by the driver of the vehicle to steer the wheels 4. The steering arrangement 2 comprises a steering linkage means 6 extending from the steering wheel 3 down to a Hydraulic Power Assisted System (HPAS) 7 for converting angular rotation in the steering linkage 6 to a linear movement via a steering member 8. The steering linkage means 6 comprises an electric steering gear. The HPAS may be of conventional type comprising a hydraulic cylinder (not shown) and a torsion bar (not shown). The steering member 8 is coupled on opposite ends to a left and right wheel 4 and configured to turn the wheels 4 in response to steering signals from the steering wheel 3.

The system 1 further comprises an actuator 9 to provide supported adjustment of the steering angle. The actuator 9 is preferably formed by an electric motor.

The actuator 9 provides a guiding force, and more specifically a guiding torque, or assist torque, to the steering assembly for assisting the driver in steering the steering wheel. The electric motor may be arranged around a steering column in the steering arrangement 2, wherein the magnetic field acts directly on the steering column. Alternatively, the electric motor may be arranged beside the steering column and act on the steering column via a mechanical linkage, preferably via pinion gears.

The system 1 further comprises a torque-measuring device, or sensor, 10 for measuring a manual torque applied by the driver to the steering wheel. The torque-measuring device 10 is of elastic constitution and preferably comprises a torsion bar. In other words, a steering wheel angle is measured via the torsion bar. More specifically, the electric steering gear comprises said torsion bar. In other words, the torque sensor 10 detects, as the steering torque applied to the steering wheel, a relative displacement in a circumferential direction which is generated between the upper and lower shafts of the steering shaft turning about the axis of the steering wheel according to turn of the steering wheel with twist of the torsion bar interposed between the upper and lower shafts.

Preferably, a steering torque is determined by measuring the twist of the torsion bar in the steering arrangement. More precisely, a first angular sensor is arranged at a first end of the torsion bar and a second angular sensor is arranged at a second end of the torsion bar (opposite the first end). The steering torque can be determined based on the relative angular movement (twist) of the torsion bar and the stiffness of the torsion bar. According to an alternative, one or several strain gauges may be used.

The system 1 further comprises an Electrical Power Assisted Steering (EPAS) system 11. The EPAS 11 comprises a regulating loop 12, which is configured to achieve a torque-free steering. The regulating loop 12 is configured to receive an input signal indicative of a current steering torque in the steering wheel 3. The input signal is received from the torque-measuring device 10. Basically, the regulating loop 12 is configured to output a signal to the actuator 9 so that said torque free steering is achieved.

The regulating loop 12 comprises a controller, or regulator, 27 which comprises a filter function. The filter function may be based on an inverse model of the steering dynamics of the present vehicle. Further, the regulator 27 may be configured to reduce errors. in the model and to reduce disturbances and measurement noise in order to reduce the risk of instability in the system.

The regulator 27 is configured to receive a signal indicative of a torque to be applied to the steering arrangement via the electric motor and in response thereto produce an output signal. The regulating loop 12 further comprises an electric motor control means 28, which is configured to receive the output signal indicative of a torque from the regulator 27 and produce a signal with a corresponding current value to the electric motor. According to an alternative, the regulator 27 and the electric motor control means 28 are combined in a single controller.

The EPAS further comprises a controlling function 13, below referred to as a reference generator, which is configured to determine a desired torque to be applied to the steering wheel in order to provide the driver with a desired steering feel. In other words, the reference generator describes a nominal vehicle.

Further, the reference generator 13 is operatively connected to the regulating loop 12 and outputs a signal indicative of a desired steering torque. The regulating loop is configured to compare the desired steering torque to the actual, current steering torque and continuously adapt the output signal to the actuator so that the desired steering torque is transmitted to the driver. In other words, the actuator is controlled so that it applies the difference in torque between the desired torque value from the reference generator and the current actual torque in the steering assembly so that the actual torque is controlled to substantially equal the desired torque.

The reference generator 13 comprises at least one steering device guiding force operation model and in the example in FIG. 1 a plurality of guiding force operation models 14,15, 16,17,18. The guiding force operation model preferably comprises a mathematical model. The model (s) is designed in a way to achieve a desired steering feel in the steering device. Thus, the model (s) can be designed in different ways for different vehicle types and/or for different desired steering feels.

Further, the model (s) comprises at least one desired steering characteristic parameter. More specifically, each model is configured to produce a guiding torque value T for one desired and predetermined steering characteristic parameter based on at least one input 19. In other words, the steering characteristic parameter is a guiding force influencing operational parameter. Each model comprises a mathematical function, wherein the torque value is determined as a function of a value of the input, see illustrated examples of the functions in FIG. 1.

The individual torque values resulting from the models are summed up to a torque sum, which forms an output 20 from the reference generator. According to the shown embodiment, the reference generator comprises models for the following steering characteristic parameters: vehicle lateral acceleration, damping of steering device movements, tire friction, self alignment of the steering device to a neutral position and friction in the mechanical connection between the steering device and the wheels.

The signals input to the reference generator comprises a at least one signal indicative of a steering intent of the driver, such as a steering wheel angle ($\delta$) and a rate of change of the steering wheel angle ($d\delta/dt$). According to an alternative to the steering wheel angle, the signal indicative of a steering intent may be an electric motor angle or a wheel angle. According to an alternative to the rate of change of the steering wheel angle, the signal indicative of a steering intent may be a rate of change of the electric motor angle or a rate of change of the wheel angle.

The signals input to the reference generator comprises at least one signal indicative of a vehicle body motion, such as lateral acceleration (Ay) and/or yaw rate. Such a vehicle body motion may be sensed by a sensor arranged in the vehicle.

The vehicle lateral acceleration model 14 represents a predetermined relationship between a guiding torque value and the current lateral acceleration for achieving a desired steering feel. Thus, the model 14 receives a signal indicative of a current lateral acceleration as an input signal. According to the example function shown in FIG. 1, the torque value increases dramatically for small input values of the lateral acceleration. Further, the torque value increases substantially less for larger input values of the lateral acceleration. In other words, the curve flattens out. The vehicle lateral acceleration model 14 is preferably a pure statical mapping. According to a preferred example, the vehicle lateral acceleration is the most important steering characteristic parameter.

The damping model 15 represents a predetermined relationship between a guiding torque value and the current steering wheel speed for achieving a desired steering feel. Thus, the damping model 15 preferably receives a signal indicative of a steering wheel speed (rate of change of the steering wheel position).

According to the example function shown in FIG. 1, the torque value increases dramatically for small input values of the steering wheel speed. Further, the torque value increases substantially less for larger input values of the steering wheel speed. In other words, the curve flattens out. The damping model 15 is preferably a pure statical mapping. The torque value output from the damping model is configured to act in an opposite direction with regard to the current steering wheel speed. The damping model is preferably designed so that the resulting torque is smaller for higher steering wheel speeds and higher for smaller steering wheel speeds. In this way, the damping torque is proportional to the steering wheel angle speed during normal driving and limited to a maximum value during parking or evasive manouevres.

Thus, the vehicle lateral acceleration model 14 and the damping model 15 are linked to each other.

The self alignment model 17 represents a predetermined relationship between a guiding torque value and the current steering wheel angle for achieving a desired steering feel. By self alignment of the steering device to a neutral position is meant an active return, i.e. the return of the released steering wheel to a central setting. The self alignment model 17 preferably receives a signal indicative of the steering wheel angle and a signal indicative of vehicle speed as input signals. The purpose of the vehicle speed input signal is to be able to modulate the desired aligning torque with the current vehicle speed in a way that the self alignment torque can be reduced during high speed driving.

Regarding the friction models 16,18; a certain amount of friction feel in the steering wheel is desired. For example, Coulomb friction is desired during on-centre handling in order to achieve a desired torque build-up for small steering wheel angle deviations. Further, Coulomb friction is as well desired while driving long curves, so that the steering forces are reduced, wherein the driver can "rest" the steering wheel on the friction.

The tire model 16 comprises a hysteresis curve, which represents a tire model. Preferably, the model 16 is a dynamic model of an unrolling tire with regard to steering torque. The relation between the steering wheel angle and the torque is given by a physical relationship, where the deflection of individual rubber elements is modeled dependent on the differential angle of the steering wheel and the torsion and relaxation of the rubber elements due to the rolling tire. The resulting model yields thus a smaller hysteresis effect with increasing vehicle speed and constant steering wheel angle frequency.

The inventive method creates conditions for canceling the actual friction effect in the steering wheel resulting from the actual steering arrangement and instead applying a desired resistance torque to the steering wheel, which represents a nominal friction feel for the driver. Thus, the hardware (mechanical steering arrangement) is decoupled from the friction steering feel. In other words, the invention creates conditions an application-independent (hardware-independent) friction steering feel.

The tire friction model 16 and the mechanical connection friction model 18 are in principle similar to each other. The tire friction model 16 represents the friction between the tire and the ground while the mechanical connection friction model 18' represents the friction in the upper steering wheel steering column assembly. Thus, the friction coefficient in the mechanical connection friction model 18 is higher than in the tire friction model 16. The tire friction model 16 preferably receives a signal indicative of a steering wheel angle and a signal indicative of vehicle speed. The mechanical connection friction model 18 preferably receives a signal indicative of a steering wheel angle.

Figure 5:
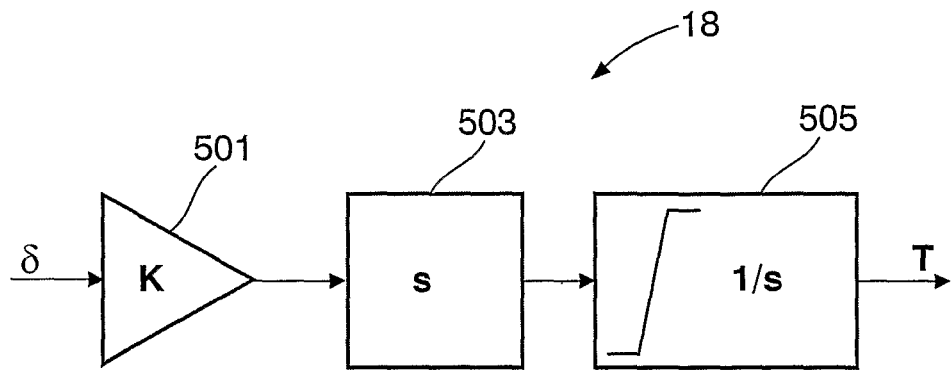
FIG. 5-6 shows an embodiment for a friction model.
Figure 6:
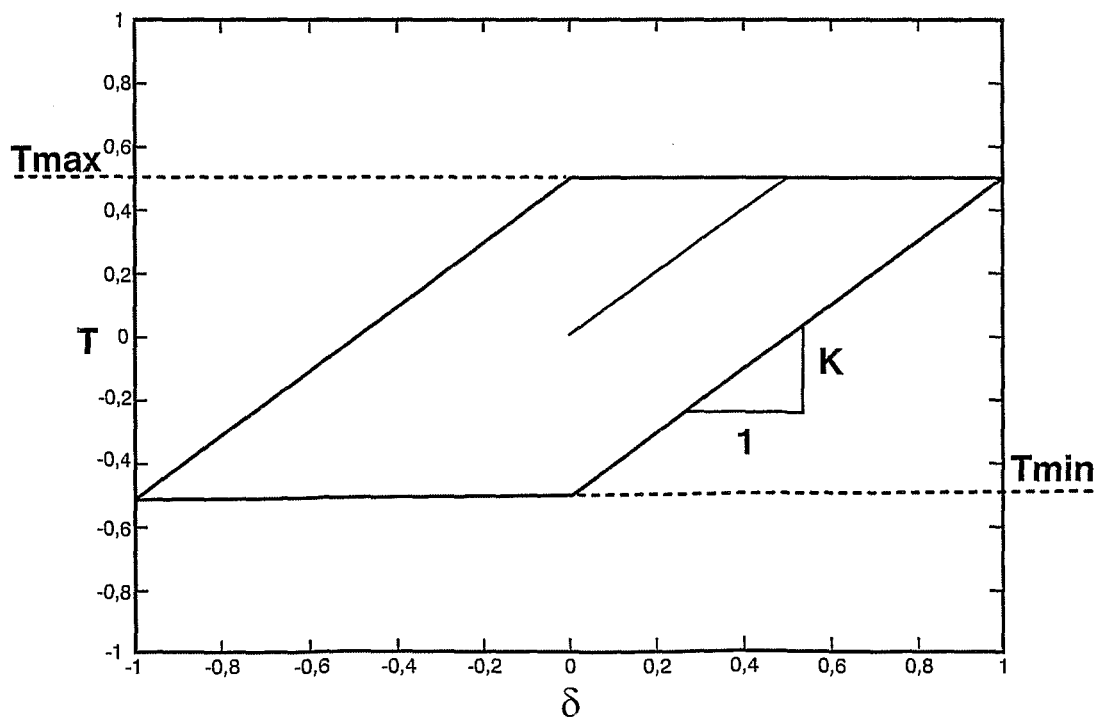

FIGS. 5-6 show in more detail an example of the friction model 16,18. The value of the steering wheel angle δ is input to a first box 501 representing a stiffness K, which corresponds to a lumped spring stiffness in Nm/Rad. The resulting value from the first box 501 is input to a second box 503 representing a derivative as indicated by the Laplace operators. The derived steering wheel angle signal, i.e. the steering wheel angle speed multiplied with the stiffness K is passed into a third box 505 representing an integrating function with anti windup functionality, indicated through the integrational limits and the inverse of the laplace transformator. The limit values are chosen in order to limit the frictional torque to the desired maximum and minimum values. The mentioned antiwindup functionality is intended to cease integration once the integrational limits are reached. The resulting value from the second box 503 is input to a third box 505 representing an integrator w for Anti Windup. The relationship between the steering wheel angle δ and the output torque value is shown in FIG. 6.

The steering characteristic model (s) 14,15,16,17,18 is preferably designed so that a different steering characteristic parameter takes precedence over the others in different driving scenarios. According to one example, the lateral acceleration is configured to take precedence over the other steering characteristic parameters during driving in high speed. According to. a further example, steering system friction and tire friction are configured to take precedence over the other steering characteristic parameters during driving in low speed. The damping force is equally active regardless of vehicle speed. According to a further example, the self alignment is configured to take precedence over the other steering characteristic parameters during driving in an intermediate speed interval between the high speed and the low speed.

The system 1 further comprises a safety function 21 in the form of a lane keeping control function. The lane keeping control function 21 is configured to avoid a departure from an intended desired future trajectory of the vehicle. The lane keeping function 21 is configured to predict if a first guiding force to a vehicle steering device is sufficient in order to avoid an unintentional lane departure based on a current driving scenario. More specifically, the lane keeping control function 21 receives at least one input 22,23,24 indicative of the current driving scenario and responsively determines an output torque value 25.

The lane keeping control function 21 comprises a lane monitoring system 33, preferably comprising a camera. The lane monitoring system 33 produces a signal 23 indicative of a current lane position. The lane keeping control function 21 further receives a signal 22 indicative of a required lane position. The lane keeping control function 21 further receives a signal indicative of a vehicle speed.

The lane keeping control function 21 comprises a feed forward portion 29,30, which in a first control function 29 receives said signal indicative of a required lane position and said signal indicative of a vehicle speed. The first control function 29 is configured to determine (calculate) a lateral acceleration value based on the required lane position and the vehicle speed. In other words, when the vehicle approaches a curve, a value of the lateral acceleration is calculated for maintaining the vehicle in the desired lane during the curve. The second control function 30 receives a signal from the first control function 29 indicative of said lateral acceleration and responsively produces an output signal indicative of a corresponding torque value.

The second control function 30 comprises a lateral acceleration model 34 which is preferably the same as the lateral acceleration model 14 in the reference generator 13.

Further, the lane keeping control function 21 comprises a feedback portion 31,32, which in a first control function 31 calculates a desired steering wheel angle for minimizing the difference between the desired lane position and the actual lane position. A second control function 32 is configured to determine a difference between the desired steering wheel angle and the actual steering wheel angle (δ) and produce a corresponding torque signal. The torque values in the signals from the feed forward portion 30 and the feedback portion 32 are summed up to an output torque value from the lane keeping control function 21.

By using the same lateral acceleration model in the reference generator 13 and in the lane keeping system 21, the complete control system is balanced. Further, the lane keeping control functionality can make use of the presence of the reference generator 13 in terms of predicting the required steering wheel torque given a desired vehicle trajectory. This is possible due to the properties of the reference generator 13 as the steering wheel torque for a given lateral acceleration is prescribed. The lane keeping functionality can thus use the reference generator 13 in order to obtain the required maximum steering wheel torque in order to obtain a desired lane position given a desired vehicle trajectory in terms of required lateral acceleration. Thus, using a safety function, such as lane keeping, in combination with the reference generator is especially advantageous as the successfulness of an intended intervention can be determined prior to an intended intervention and not during an intervention, as in the case with traditional boost curve based steering systems. The amount of unsuccessfully aborted interventions throughout the operational life of the vehicle is thus minimized.

The output torque value 25 from the lane keeping control function 21 and the output torque value 20 from the reference generator 13 are summed up to a total torque value 26, which is indicative of a desired steering torque to be applied to the steering wheel 3. The regulating loop 12 receives the total desired torque value 26.

Thus, the EPAS is configured to predict a total guiding torque comprising the resulting desired torque 25 from the lane keeping function and the resulting desired torque 20 from the reference generator 13. The EPAS is further configured for comparing the predicted total guiding torque with a limit value, and if the predicted total guiding force exceeds the limit value, in advance deciding whether to apply said predicted total guiding torque to the steering wheel for avoiding the lane departure or not.

If the predicted total guiding force exceeds the limit value, it is decided not to apply said predicted total guiding torque to the steering wheel for avoiding the lane departure. If the predicted total guiding force does not exceed the limit value, it is decided to apply said predicted total guiding torque to the steering wheel for avoiding the lane departure. Further, the determined total guiding force is also applied to the steering wheel.

According to a first preferred example, a first guiding force (representing the resulting desired torque 25 from the lane keeping function) is cancelled. Thus, the output desired steering torque value from the controller 27 only comprises the desired steering torque from the reference generator 13.

According to a second example, the controller is configured to modify the second guiding, force (the resulting torque from the reference generator) so that the predicted total guiding force is sufficient for avoiding the undesired situation. According to a detailed example, the controller is configured to modify said at least one guiding force operation model so that the predicted total guiding force is sufficient for avoiding the undesired situation during said driver operation. Thus, said steering characteristics in the models 14,15,16,17,18 can be modified/switched off.

Figure 2:
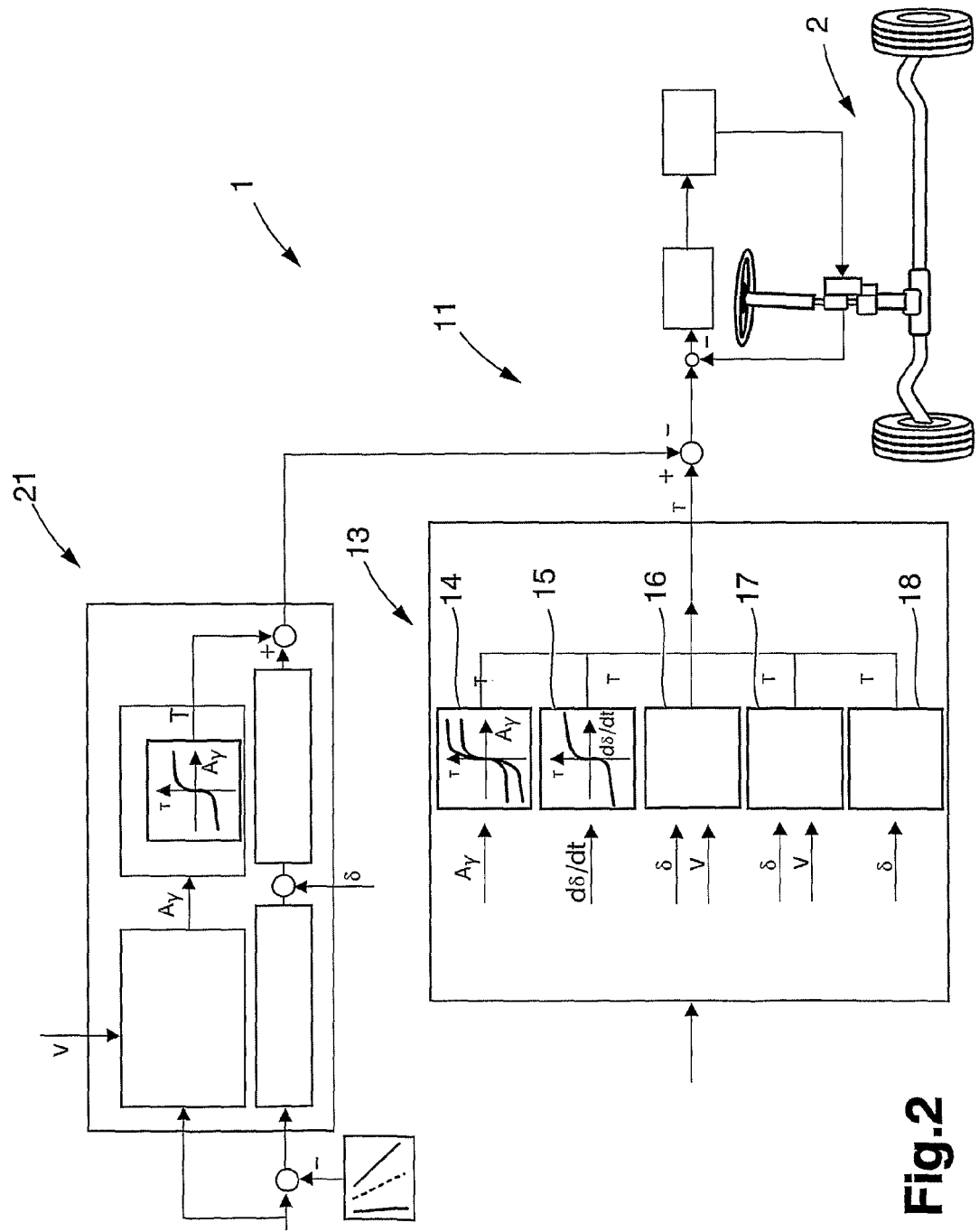
FIG. 2 shows the system in FIG. 1, in which certain steering characteristics in a guiding force operation model have been modified, FIG. 3 schematically shows a work flow for the inventive method according to a first embodiment, FIG. 4 schematically shows a work flow for the inventive method according to a second embodiment.

FIG. 2 shows an embodiment in which the self alignment torque 17 and the frictional effects 16,18 have been cancelled in for the purpose of improving the steering systems controllability, as frictional effects are known to have a negative effect on the systems control quality in terms of angle control as during said lane keeping intervention.

The frictional effects 16,18 are preferably always cancelled during a lane keeping manouevre.

Further, in the embodiment shown in FIG. 2, the lateral acceleration model comprises two curves, which represents that the lateral acceleration model is modified by moving the curve along the ordinate (Torque axis). The principle of moving the torque curve can of course be performed irrespective of any canceling of other steering characteristic models. The primary purpose of changing the lateral acceleration model is to be able to fulfill legal requirements expressed in maximum amount of required torque in order to override a commenced intervention, while at the same time being able to intervene with a required authority expressed in maximum level of lateral acceleration. In other word, the assistance behaviour of the system can be reconfigured during an intervention in order to suit the needs of said lane keeping function in terms of regaining an intended lane position, while at the same time being able to both maintain stability of the steering system and meet legal requirements.

The system is preferably configured to cancel a guiding force contribution of at least one of said plurality of preselected desired steering characteristic parameters according to a priority list of said plurality of preselected desired steering characteristic parameters. On the other hand, if it is predicted that too much steering feel has to be sacrificed in order to accomplish the intervention, it can be decided not to apply the predicted total guiding force at all (this is especially important in steer-by-wire systems and reference generator systems where there is no inherent steering feel resulting from a mechanical connection between the steering device and the ground).

The EPAS creates conditions for predicting the assist torque supplied to the driver via the steering wheel during the complete intervention, which may be performed in a time interval of a few seconds.

The present invention concerns a method for assisting the driver of the vehicle during operation. According to a preferred embodiment, the control method is configured to allow a control of the steering characteristics experienced by a driver of the vehicle during traveling. In other words, the control method is configured to provide the operator with a steering feel (or steering sensitivity or tactile feedback) through the steering wheel.

Figure 3:
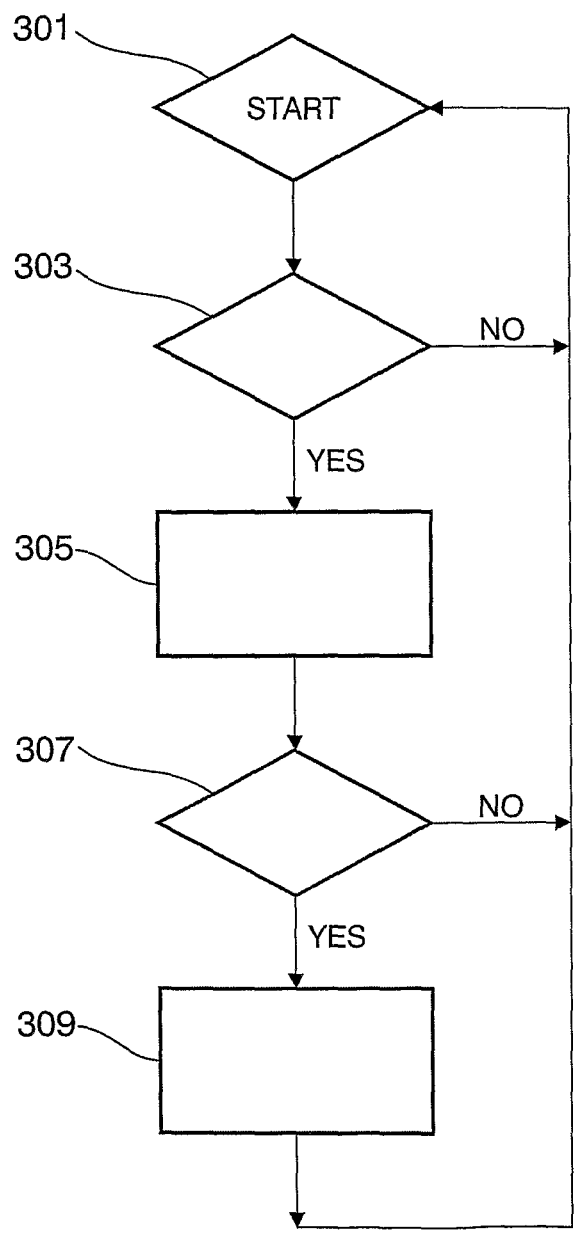

FIG. 3 discloses a flow chart for an embodiment of the control method. The method starts in box 301. The method comprises the step of predicting 303 if a first guiding force to a vehicle steering device is desired in order to avoid an undesired situation based on a current driving scenario and if the first guiding force is desired, the method moves on to predicting 305 a total guiding force comprising the first guiding force, which would be applied to the steering device for avoiding the undesired situation. The method then moves on to comparing 307 the predicted total guiding force with a limit value, and if the predicted total guiding force exceeds the limit value, in advance deciding 309 whether to apply said predicted total guiding force to the steering device for avoiding the undesired situation or not.

Preferably, the method comprises the further step of deciding to not apply said predicted total guiding force if it exceeds the limit value. Preferably, the method comprises the further step of deciding to apply said predicted total guiding force only if it is estimated to be sufficient for entirely avoiding the undesired situation.

If the first guiding force is predicted not to be desired in step 303, the method goes back to start 301 directly. Likewise, if the predicted total guiding force in step 307 does not exceed the limit value, the method goes back to start 301 directly. Further, the method is continuously repeated.

Figure 4:
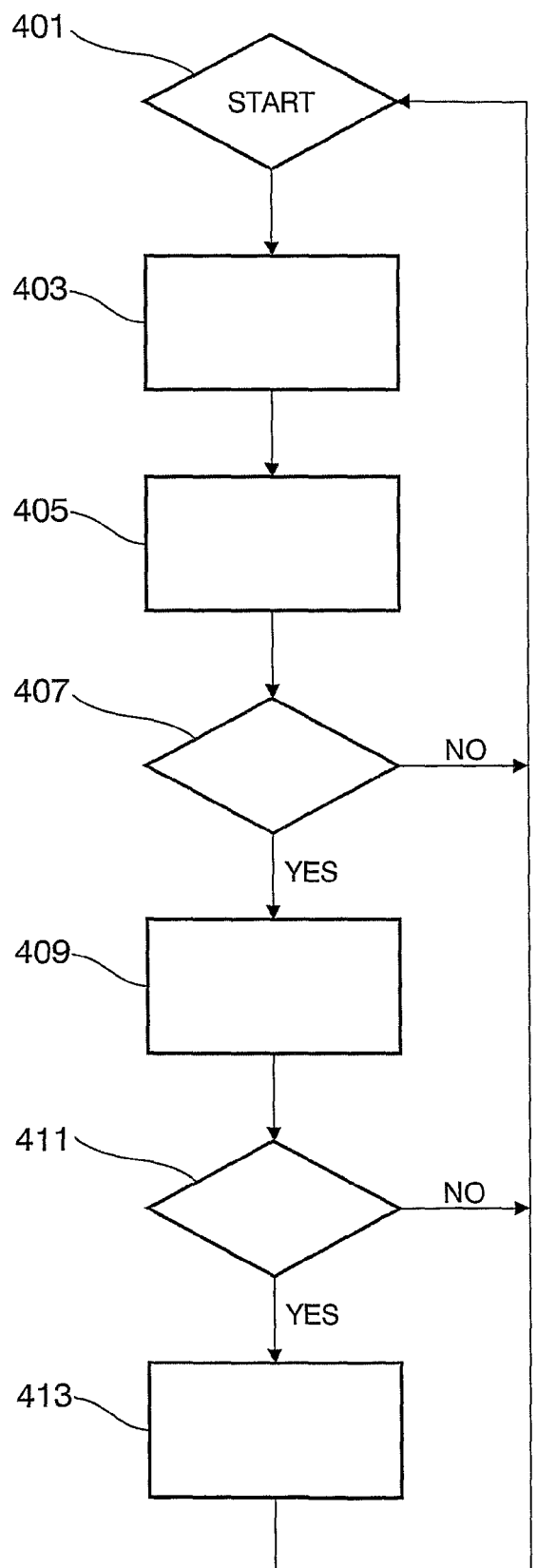

FIG. 4 discloses a flow chart for a second embodiment of the control method. The method starts in box 401. The method comprises the step of continuously during operation determining 403 a second guiding force based on at least one guiding force operation model, continuously applying 405 a total guiding force comprising the determined second guiding force to the steering device. Further, the method comprises the step of predicting 407 if a first guiding force to a vehicle steering device is desired in order to avoid an undesired situation based on a current driving scenario and if the first guiding force is desired, the method moves on to predicting 409 a total guiding force as a sum of the first guiding force and the second guiding force, which would be applied to the steering device for avoiding the undesired situation. The method then moves on to comparing 411 the predicted total guiding force with a limit value, and if the predicted total guiding force exceeds the limit value, in advance deciding 413 whether to apply said predicted total guiding force to the steering device for avoiding the undesired situation or not.

The steps of determining 403 the second guiding force and applying 405 a total guiding force comprising the determined second guiding force to the steering device are performed irrespective of any prediction of the first guiding force.

Preferably, the method is preferably performed in a vehicle with the mechanical connection 6 between the steering device 3 and the wheels 4 for a mechanical transmission of steering signals from the steering device to the wheels. The method then comprises the further steps of decoupling a driver steering feel from the influence of the mechanical connection, and instead providing the driver with a desired steering feel based on the determined total guiding force.

Preferably, the method comprises the further step of deciding to not apply said predicted total guiding force if it exceeds the limit value. Preferably, the method comprises the further step of deciding to apply said predicted total guiding force only if it is estimated to be sufficient for entirely avoiding the undesired situation.

If the first guiding force is predicted not to be desired in step 407, the method goes back to start 401 directly. Likewise, if the predicted total guiding force in step 411 does not exceed the limit value, the method goes back to start 401 directly. Further, the method is continuously repeated.

Any one of the two embodiments in FIGS. 3 and 4 preferably comprises the further step of receiving at least one signal representing a vehicle state and determining a value of said at least one desired steering characteristic parameter based on the vehicle state. Said vehicle state comprises at least one of a driver steering input, a vehicle yaw rate, a vehicle lateral acceleration and a vehicle speed. The steering angle and the steering torque are preferred measurements that indicate the steering input, or steering intent, of the driver.

With regard to friction feel, according to an example embodiment, the method comprises the step of determining the desired resistance torque based on an input representing a steering angle. By determining a direction of the actual steering angle (clockwise or counterclockwise) and instantly applying a torque in the other direction, the effect of the friction in the steering arrangement can be effectively cancelled.

The steering angle is preferably determined by measuring a steering wheel deflection. Alternatively, the steering, angle may be determined by measuring a wheel angle or anywhere inbetween the steering wheel and the ground engaging wheel in the mechanical steering arrangement.

Although the invention has above been described for lane keeping, the invention is applicable for other active safety functions, such as other path correction functions, such as side wind compensation or collision avoidance (such as Emergency Lane Assist, ELA). In other words, a lane guidance regulation system is integrated into the EPAS. In the same way, further functions may be integrated into an exemplary method according to the present invention.

Further, the method is applicable in steer-by-wire systems.

In order to further increase the driving stability of vehicles, steering systems may include a driving dynamics regulator that adjusts the setting of the steered wheels independently from the steering wish of the driver.

The reference generator 13 and the regulating loop 12 (comprising the controllers 27,28) are preferably implemented in software.

A value of the vehicle lateral acceleration may be estimated from a measured vehicle yaw rate.

The invention claimed is:

1. A method for assisting a driver of a vehicle during operation in order to avoid an undesired situation based on a current driving scenario comprising
    predicting, via a controller and before an intervention of a lane keeping control function is started, if a first guiding force, received from the lane keeping control function, to a vehicle steering device is desired in order to avoid the undesired situation, and if the first guiding force is desired:
        predicting , before the intervention of the lane keeping control function is started, a total guiding force comprising the first guiding force and a second guiding force received from a reference generator, which would be applied to the steering device for avoiding the undesired situation,
        comparing , before the intervention of the lane keeping control function is started, the predicted total guiding force with a limit value, and
        a) if the predicted total guiding force is below the limit value, applying the total guiding force, and
        b) if the predicted total guiding force exceeds the limit value reducing the total guiding force by one of reducing the first guiding force or canceling the first guiding force.

2. The method according to claim 1, comprising deciding to not apply the predicted total guiding force if it exceeds the limit value.

3. The method according to claim 1, comprising deciding to apply the predicted total guiding force only if it is estimated to be sufficient for entirely avoiding the undesired situation.

4. The method according to claim 1, comprising modifying the predicted total guiding force so that it does not exceed the limit value.

5. The method according to claim 1, comprising determining the second guiding force based on at least one steering device guiding force operation model, and determining the predicted total guiding force as a sum of the first guiding force and the second guiding force.

6. The method according to claim 5, comprising, irrespective of any prediction of the first guiding force:
    continuously during operation determining the second guiding force, continuously applying the total guiding force comprising the determined second guiding force to the steering device, and
only if the first guiding force is desired determining the predicted total guiding force as the sum of the first guiding force and the second guiding force.

7. The method according to claim 5, wherein the at least one guiding force operation model comprises at least one desired steering characteristic parameter.

8. The method according to claim 5, wherein the at least one guiding force operation model comprises a plurality of desired steering characteristic parameters.

9. The method according to any one of claim 7, wherein the at least one desired steering characteristic parameter comprises at least lateral acceleration.

10. The method according to claim 7, wherein the at least one desired steering characteristic parameter comprises at least one of damping of steering device movements, tire friction, self alignment of the steering device to a neutral position and friction in a mechanical connection between the steering device and the wheels.

11. The method according to claim 7, comprising receiving at least one signal representing a vehicle state and determining a value of the at least one desired steering characteristic parameter based on the vehicle state.

12. The method according to claim 11, wherein the vehicle state is indicative of at least one of a driver steering input, a vehicle lateral acceleration and a vehicle speed.

13. The method according to claim 5, comprising modifying the second guiding force so that the predicted total guiding force does not exceed the limit value.

14. The method according to claim 5, comprising modifying the at least one steering device guiding force operation model so that the predicted total guiding force is sufficient for avoiding the undesired situation during the driver operation.

15. The method according to claim 8, comprising deciding whether to cancel a guiding force contribution of at least one of the plurality of desired steering characteristic parameters so that the predicted total guiding force is sufficient for avoiding the undesired situation during the intervention.

16. The method according to claim 1, comprising
performing the method in a vehicle with a mechanical connection between the steering device and the wheels for a mechanical transmission of steering signals from the steering device to the wheels,
decoupling a driver steering feel from the influence of the mechanical connection, and instead
providing the driver with a desired steering feel based on the determined total guiding force.

17. The method according to claim 1, wherein the steering device comprises a steering wheel and the total guiding force forms a guiding torque applied to the steering wheel.

18. The method according to claim 1, wherein the undesired situation represents a predicted departure from a predicted desired future trajectory of the vehicle.

19. A system for assisting a driver of a vehicle during operation in order to avoid an undesired situation based on a current driving scenario comprising
means for predicting, before an intervention of a lane keeping control function is started, if a first guiding force, received from the lane keeping control function, to a vehicle steering device is desired in order to avoid the undesired situation, and
means for predicting, before the intervention of the lane keeping control function is started, a total guiding force comprising the first guiding force and a second guiding force received from a reference generator, which would be applied to the steering device for avoiding the undesired situation and for comparing, before the intervention of a lane keeping control function is started, the predicted total guiding force with a limit value and
a) if the predicted total guiding force is below the limit value, applying the total guiding force, and
b) if the predicted total guiding force exceeds the limit value, reducing the total guiding force by one of reducing the first guiding force or canceling the first guiding force.

20. The system according to claim 19, comprising means for determining the second guiding; force based on at least one steering device guiding force operation model, and means for determining the predicted total guiding force as a sum of the first guiding force and the second guiding force.

21. The system according to claim 20, wherein the at least one guiding force operation model comprises at least one desired steering characteristic parameter.

22. The system according to claim 21, wherein the at least one desired steering characteristic parameter comprises at least one of damping of steering device movements, tire friction, self alignment of the steering device to a neutral position and friction in a mechanical connection between the steering device and the wheels.

23. The system according to claim 19, wherein the system comprises a mechanical connection between the steering device and the wheels for a mechanical transmission of steering signals from the steering device to the wheels, means for decoupling a driver steering feel from the influence of the mechanical connection and for providing the driver with a desired steering feel based on the determined total guiding force.

24. A system for assisting a driver of a vehicle during operation in order to avoid an undesired situation based on a current driving scenario, wherein the system comprises a controller having
a control function for predicting, before an intervention of a lane keening control function is started, if a first guiding force, received from the lane keeping control function, to a vehicle steering device is desired in order to avoid the undesired situation,
a control function for predicting, before the intervention of the lane keeping control function is started, a total guiding force comprising the first guiding force and a second guiding force received from a reference generator, which would be applied to the steering device for avoiding the undesired situation and for comparing, before the intervention of the lane keeping control function is started, the predicted total guiding force with a limit value and
a) if the predicted total guiding force is below the limit value, applying the total guiding force, and
b) if the predicted total guiding force exceeds the limit value, reducing the total guiding force by one of reducing the first guiding force or canceling the first guiding force.

25. The system according to claim 24, wherein the system comprises a control function for determining the second guiding force based on at least one steering device guiding farce operation model, and a control function determining the predicted total guiding force as a sum of the first guiding force and the second guiding force.

26. The system according to claim 25, wherein the at least one guiding force operation model comprises at least one desired steering characteristic parameter.

27. The system according to claim 26, wherein the at least one desired steering characteristic parameter comprise sat least one of damping of steering device movements, tire friction, self alignment of the steering device to a neutral position and friction in a mechanical connection between the steering device and the wheels.

28. The system according to claim 24, wherein the system comprises a mechanical connection between the steering device and the wheels for a mechanical transmission of steering signals from the steering device to the wheels, a control function for decoupling a driver steering feel from the influence of the mechanical connection and for providing the driver with a desired steering feel based on the determined, total guiding force.

* * * * *